(12) United States Patent
Xu (10) Patent No.: US 9,904,355 B2
(45) Date of Patent: Feb. 27, 2018

(54) DISPLAY METHOD, IMAGE CAPTURING METHOD AND ELECTRONIC DEVICE

(71) Applicants: Beijing Lenovo Software Ltd., Beijing (CN); Lenovo (Beijing) Co., Ltd., Beijing (CN)

(72) Inventor: Bo Xu, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 169 days.

(21) Appl. No.: 14/229,921

(22) Filed: Mar. 30, 2014

(65) Prior Publication Data
US 2015/0029351 A1    Jan. 29, 2015

(30) Foreign Application Priority Data

Jul. 29, 2013   (CN) .......................... 2013 1 0322876

(51) Int. Cl.
*G06F 3/01*    (2006.01)
*H04N 5/232*   (2006.01)

(52) U.S. Cl.
CPC .............. *G06F 3/01* (2013.01); *G06F 3/011* (2013.01); *H04N 5/23203* (2013.01)

(58) Field of Classification Search
CPC ............................. H04N 5/23203; G06F 3/01
USPC ....................................................... 348/211.4
See application file for complete search history.

(56) References Cited

U.S. PATENT DOCUMENTS

| | | | |
|---|---|---|---|
| 8,487,915 B1* | 7/2013 | Birger ................ | H04N 9/3173 178/18.01 |
| 9,002,400 B2 | 4/2015 | Kim et al. | |
| 9,507,485 B2 | 11/2016 | Cai et al. | |
| 2004/0030493 A1* | 2/2004 | Pechatnikov .......... | G01C 21/26 701/411 |
| 2006/0132675 A1* | 6/2006 | Choi ...................... | G06F 1/1626 349/76 |

(Continued)

FOREIGN PATENT DOCUMENTS

| | | |
|---|---|---|
| CN | 101969499 A | 2/2011 |
| CN | 102419680 A | 4/2012 |
| CN | 103162706 A | 6/2013 |

OTHER PUBLICATIONS

First Chinese Office Action regarding Application No. 201310322876.3 dated Dec. 21, 2016. English translation provided by http://globaldossier.uspto.gov.

*Primary Examiner* — Twyler Haskins
*Assistant Examiner* — Fayez Bhuiyan
(74) *Attorney, Agent, or Firm* — Harness, Dickey & Pierce, P.L.C.

(57) ABSTRACT

This application discloses a display method and an electronic device, where the method is applicable to a first electronic device including a sensing unit and a display unit, and the method includes: obtaining first posture information of the first electronic device by the sensing unit when the first electronic device satisfies a first predetermined condition; determining a first picture according to the first posture information; displaying the first picture by the display unit; detecting second posture information of the first electronic device by the sensing unit when there is a change in posture of the first electronic device; determining a second picture according to the second posture information; and displaying the second picture by the display unit.

13 Claims, 6 Drawing Sheets

(56) References Cited

U.S. PATENT DOCUMENTS

| | | | |
|---|---|---|---|
| 2012/0218444 A1* | 8/2012 | Stach | G06T 1/0021 348/241 |
| 2013/0076929 A1* | 3/2013 | Sirpal | G06F 3/1438 348/220.1 |
| 2013/0111369 A1* | 5/2013 | Pasquero | G06F 3/0481 715/761 |
| 2013/0150124 A1 | 6/2013 | Kim et al. | |
| 2013/0185673 A1 | 7/2013 | Cai et al. | |

* cited by examiner

DISPLAY METHOD, IMAGE CAPTURING METHOD AND ELECTRONIC DEVICE

CROSS REFERENCES OF RELATED APPLICATIONS

The present application claims the priority to Chinese Patent Application No. 201310322876.3, entitled "DISPLAY METHOD, IMAGE CAPTURING METHOD AND ELECTRONIC DEVICE", filed on Jul. 29, 2013 with the State Intellectual Property Office of People's Republic of China, which is incorporated herein by reference in its entirety.

FIELD

The disclosure relates to the field of electronics and in particular to a display method and an electronic device.

BACKGROUND

At present, an increasing number of high-science and technology electronic devices emerge in the market, and these electronic devices are provided with numerous functions and support numerous APPs, e.g., e-book, camera, gaming and other functions.

To take a picture, an electronic device typically is focused onto a central point firstly and then takes the picture with reference to the central point. For example, a user A taking a picture of a user B by means of a mobile phone may take the picture with the user B being focused so that the background surrounding the user B may also be taken into the picture as well, where the taken pictures are typically rectangular. At the mobile phone side, it may accept the operation by the user A and take a picture with the user B being focused, and due to the limitation of a camera, the mobile phone can only take a picture of a scene surrounding the user B in the range accessible to the camera but fails to take a picture of a scene beyond the range.

Therefore, when viewing pictures using the mobile phone, only the pictures ever taken by the mobile phone can be viewed, or the user has to download the pictures over the Internet using the mobile phone for viewing.

In viewing the pictures ever taken by the mobile phone, the mobile phone may have taken the pictures at some sites, but the user can only download the pictures for those sites he has never been for viewing the pictures.

The applicants have identified during making this application that conventionally the mobile phone downloading a picture over the Internet through an operation by the user can download a picture or a set of similar pictures only after accepting a key press operation or a touch operation by the user.

Consequently there is such a technical problem that the electronic device can download and display the picture or pictures only after receiving and responding to the manual operation by the user.

SUMMARY

The disclosure provides a display method and an electronic device so as to address the technical problem that the electronic device can download and display a picture only after receiving and responding to a manual operation by a user.

In an aspect, the disclosure provides the following technical solution in an embodiment of this application:

There is provided a display method applicable to an electronic device, where the electronic device includes a sensing unit and a display unit, the method includes: obtaining first posture information of the first electronic device by the sensing unit when the first electronic device satisfies a first predetermined condition; determining a first picture according to the first posture information; displaying the first picture by the display unit; detecting second posture information of the first electronic device by the sensing unit when there is a change in posture of the first electronic device; determining a second picture according to the second posture information; and displaying the second picture by the display unit.

Preferably, the obtaining the first posture information of the first electronic device by the sensing unit when the first electronic device satisfies the first predetermined condition includes: obtaining the first posture information by the sensing unit when a distance from a location of the first electronic device to a target location satisfies a predetermined threshold.

Preferably, before the determining the first picture according to the first posture information, the method further includes: downloading N pictures by the first electronic device from a second electronic device, where N is an integer greater than or equal to 2.

Preferably, the determining the first picture according to the first posture information includes: determining the first picture among the N pictures according to the first posture information.

Preferably, the determining the second picture according to the second posture information includes: determining the second picture among the N pictures according to the second posture information.

Preferably, the determining the first picture according to the first posture information includes: downloading the first picture from the second electronic device according to the first posture information.

Preferably, in a case that the first electronic device further includes a projection unit, after the determining the first picture according to the first posture information, the method further includes: projecting the first picture to a projection area by the projection unit.

Preferably, the determining the second picture according to the second posture information includes: downloading the second picture from the second electronic device according to the second posture information.

Preferably, the determining the first picture according to the first posture information includes: obtaining, according to the first posture information, a picture including the first posture information in a set of pictures stored in the first electronic device, and determining the picture including the first posture information as the first picture.

Preferably, the determining the second picture according to the second posture information includes: obtaining, according to the second posture information, a picture including the second posture information in a set of pictures stored in the first electronic device, and determining the picture including the second posture information as the second picture.

In another aspect, the disclosure provides the following technical solution in another embodiment of this application:

There is provided an electronic device including a sensing unit and a display unit. The electronic device includes: the sensing unit configured to obtain first posture information of the electronic device when the electronic device satisfies a first predetermined condition; a first determination unit configured to determine a first picture according to the first posture information; the display unit configured to display the first picture; the sensing unit configured to detect second posture information of the electronic device when there is a change in posture of the electronic device; a second determination unit configured to determine a second picture according to the second posture information; and the display unit configured to displaying the second picture.

Preferably, the electronic device further includes: a download unit configured to download N pictures from a second electronic device connected with the electronic device before the first picture is determined according to the first posture information, where N is an integer greater than or equal to 2.

Preferably, the first determination unit is further configured to determine the first picture among the N pictures according to the first posture information.

Preferably, the second determination unit is further configured to determine the second picture among the N pictures according to the second posture information.

In another aspect, the disclosure provides the following technical solution in another embodiment of this application:

There is provided an image capturing method applicable to an electronic device including a sensing unit and a display unit. The method includes: obtaining first posture information of the electronic device by the sensing unit when the electronic device detects an image capturing instruction of a user; and capturing a first image by the image capturing unit when the electronic device takes a posture corresponding to the first posture information, where the first image includes the first posture information or is associated with the first posture information, for example, the first posture information is searched for or invoked by means of the first image.

Preferably, after the capturing the first image by the image capturing unit, the method further includes: obtaining second posture information of the electronic device by the sensing unit when there is a change in posture of the electronic device; and capturing a second image by the image capturing unit when the electronic device takes a posture corresponding to the second posture information, where the second image includes the second posture information or is associated with the second posture information.

In another aspect, the disclosure provides the following technical solution in another embodiment of this application:

There is provided an electronic device including a sensing unit and a display unit, the electronic device, where the sensing unit is configured to obtain first posture information of the electronic device when the electronic device satisfies a first predetermined condition; and the image capturing unit is configured to capture a first image when the electronic device takes a posture corresponding to the first posture information, where the first image includes the first posture information or is associated with the first posture information, for example, the first posture information is searched for or invoked by means of the first image.

Preferably, the sensing unit is further configured, after the first image is captured by the image capturing unit, to obtain second posture information of the electronic device when there is a change in posture of the electronic device; and the image capturing unit is further configured to capture a second image when the electronic device takes a posture corresponding to the second posture information, where the second image includes the second posture information or is associated with the second posture information, for example, the second posture information is searched for or invoked by means of the second image.

One or more of the foregoing technical solutions have the following technical effects or advantages:

In one or more of the technical solutions, there is disclosed a display method in which a displayed picture can be changed in response to a change in posture information of the first electronic device by detecting automatically the posture of the first electronic device and then matching the corresponding picture to the posture, so the display method of the disclosure can match the corresponding picture automatically to the posture of the first electronic device without manual matching by a user. In a particular implementation, first posture information of the first electronic device is obtained by the sensing unit when the first electronic device satisfies a predetermined condition, and the first posture information here indicates a particular orientation of the first electronic device, e.g., oriented 15 degrees southward, and then when the mobile phone needs to display a picture or take a picture, only a picture at the orientation of 15 degrees southward can be obtained. Then a first picture can be further determined according to first location information and the first posture information, and the picture determined here is a picture at the same orientation as the first electronic device. Then the first picture can be displayed by the display unit. Furthermore, when there is a change in posture of the first electronic device, second posture information of the first electronic device can be detected by the sensing unit, and the posture information here can also indicate the orientation of the first electronic device. Then a second picture can be determined according to the first location and the second posture information. Finally the second picture can be displayed by the display unit.

Furthermore, for the picture download, a plurality of pictures may be downloaded as a whole to the first electronic device and then a corresponding picture can be matched to different posture information of the first electronic device. Alternatively, a corresponding picture can be downloaded in real-time according to different posture information of the first electronic device.

DETAILED DESCRIPTION

In order to address the conventional technical problem that an electronic device can download and display a picture only after receiving and responding to a manual operation by a user, embodiments of the disclosure propose a display method and an electronic device, and a general idea of the solutions is as follows:

In the disclosure, there is disclosed a display method applicable to a first electronic device including a sensing unit and a display unit.

The display method is to display a picture downloaded from a second electronic device in a different way from the conventional way that downloading and displaying are performed in response to accepting a touch by a user. The displaying way in this application is to change a displayed picture in response to a change in posture information of the first electronic device by detecting automatically the posture of the first electronic device and then matching the corresponding picture to the posture, and a particular implementation thereof is as follows:

In first step, first posture information of the first electronic device is obtained by the sensing unit when the first electronic device satisfies a first predetermined condition. The case that electronic device satisfies the first predetermined condition can refer to the case of "the distance from the location of the first electronic device to a target location satisfying a predetermined threshold". For example, a user holding the first electronic device is at the location A, and the target location is at the location B, and given the predetermined threshold of 100 kilometers, if the distance between the location A and the location B is 100 kilometers, then the first electronic device satisfies the first predetermined condition. In second step, a first picture is determined according to the first posture information. In third step, the first picture id displayed by the display unit. In fourth step, second posture information of the first electronic device is detected by the sensing unit when there is a change in posture of the first electronic device. In fifth step, a second picture is determined according to the second posture information. In sixth step, the second picture is displayed by the display unit.

The technical solution of the disclosure will be detailed below with reference to the drawings and particular embodiments thereof, and it shall be appreciated that the embodiments of the disclosure and particular features in the embodiments are meant to illustrate the technical solutions of the disclosure but are not intended to limit the technical solutions of the disclosure, and the embodiments of the disclosure and the particular features in the embodiments can be combined with each other unless there is any collision.

First Embodiment

There is disclosed a display method in an embodiment of this application.

Specifically, the method is applicable to a first electronic device including a sensing unit and a display unit.

In the embodiment of this application, the sensing unit can be a gyroscope, and the display unit can be a display screen, where the display screen here may be or may not be provided with a touch function. The first electronic device including both of the sensing unit and the display unit can be embodied in numerous electronic devices, e.g., a notebook computer, a PAD, an all-in-one computer, a mobile phone, etc.

Figure 1:
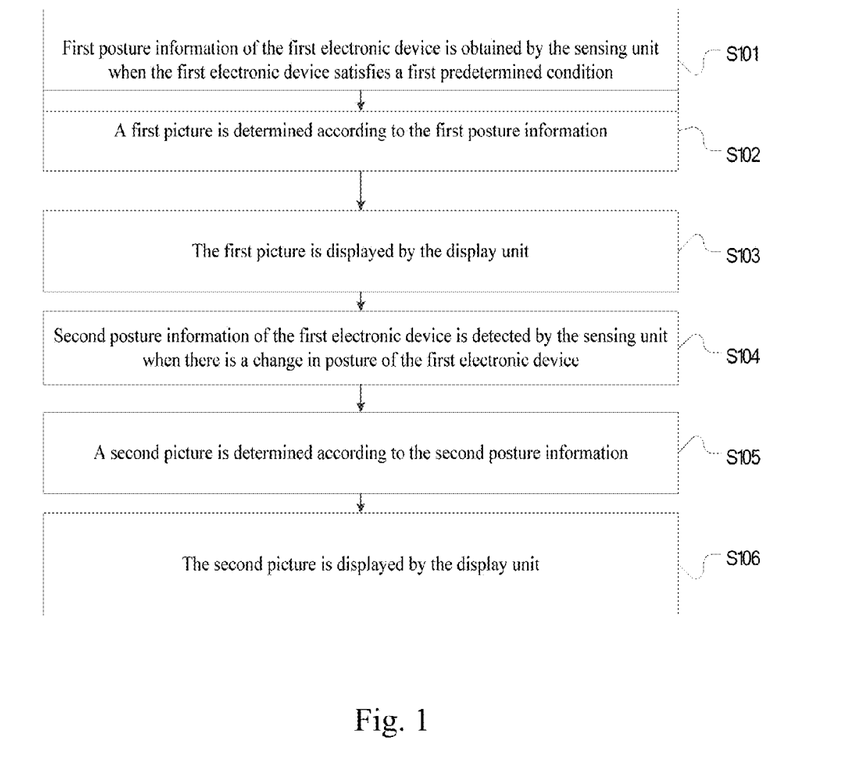
FIG. 1 is a flow chat of a display method according to an embodiment of this application.

When the first electronic device includes the sensing unit and the display unit, referring to FIG. 1, a particular implementation of the display method in the embodiment of this application is as follows:

S101: First posture information of the first electronic device is obtained by the sensing unit when the first electronic device satisfies a first predetermined condition.

S102: A corresponding first picture is determined according to the first posture information.

S103: The first picture is displayed by the display unit.

S104: Second posture information of the first electronic device is detected by the sensing unit when there is a change in posture of the first electronic device.

S105: A corresponding second picture is determined according to the second posture information.

S106: The second picture is displayed by the display unit.

Specifically, in an implementation of S101, the case that the first electronic device satisfies the first predetermined condition particularly refers to the case of "the distance from the location of the first electronic device to a target location satisfying a predetermined threshold".

In a particular implementation of S101, the first posture information can be obtained by the sensing unit when the distance from the location of the first electronic device to the target location satisfies the predetermined threshold.

S101 will be described taking a mobile phone as an example.

In S101, the target location is the location as displayed in a picture to be downloaded by a user. For example, the user needs to download a picture of the Holy Hall of Great Hero using the mobile phone, and accordingly the Holy Hall of Great Hero is taken as the target location. The first posture information can be obtained by the sensing unit only when the distance between the target location and the location of the mobile phone satisfies the predetermined threshold at this time.

For example, assuming that the particular location of the Holy Hall of Great Hero is at a site A, and the user holding the mobile phone is at the site B, if the distance between the two locations satisfies the predetermined threshold of 100 kilometers to 200 kilometers, the first posture information can be obtained by the sensing unit. Of course, the threshold exemplified here is merely intended to describe and elaborate the disclosure but not to limit the disclosure, and another threshold can be set in practice.

Figure 2:
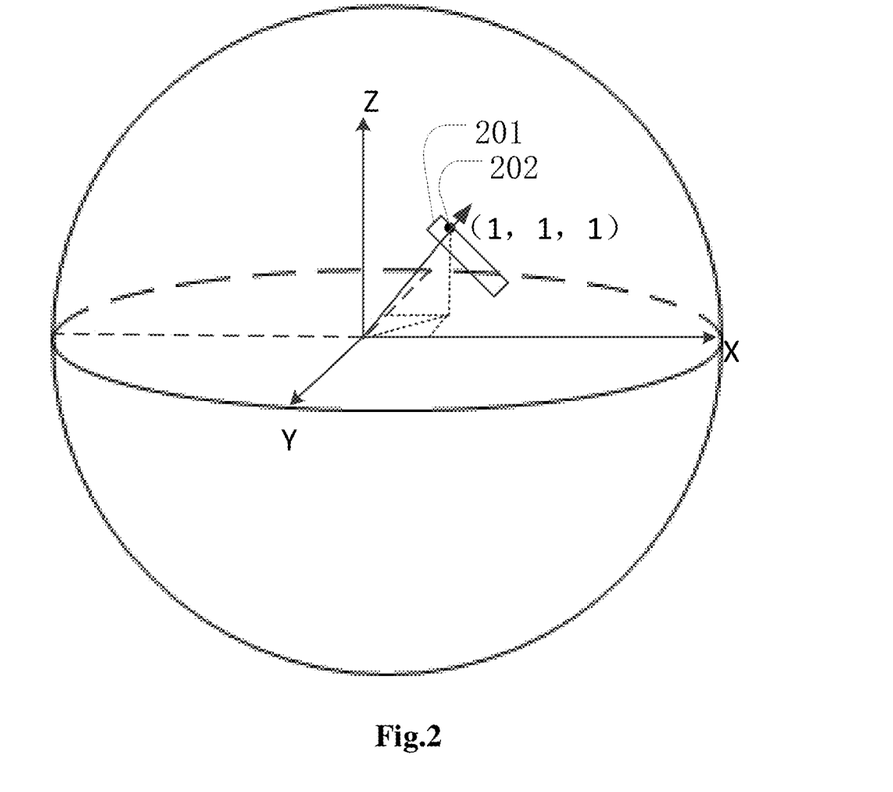
FIG. 2 is a schematic diagram of a mobile phone in a three-dimension coordinate system according to an embodiment of this application.

Furthermore, the posture information in the embodiment of this application can characterize the particular orientation of the mobile phone. Referring below to FIG. 2, parameters at the time that a mobile phone 201 is in an inclined posture are illustrated. In FIG. 2, there is a three-dimension coordinate system including X, Y and Z axes respectively. This three-dimension coordinate system can constitute a sphere with the plane of the X and Y axes being the equator at the latitude of 0 degree and the plane of the X and Z axes being the Prime meridian at the longitude of 0 degree. At this time, the mobile phone 201 is located in the three-dimension coordinate system, and a camera 202 in the mobile phone 201 is represented as a black dot in the three-dimension coordinate system at such an orientation that the direction represented by the black arrow in the figure extends from the origin of coordinate system to the black dot. Assuming that particular coordinate values of the black dot are (1, 1, 1), then the orientation of the camera 202 of the mobile phone 201 can be calculated from this segment of black solid line as having the longitude of 45 degrees and the latitude of 45 degrees, and a picture to be taken will also contain the scene at the location having the longitude of 45 degrees and the latitude of 45 degrees.

At this time, the first posture information described above can be obtained by the gyroscope. More particularly, after the first posture information is obtained, the flow can proceed to the step S102 where the corresponding first picture is determined according to the first posture information.

Specifically, the first posture information of the mobile phone has been determined in advance, and it has been known that the picture taken by the mobile phone contain the scene at the location of the longitude of 45 degrees and the latitude of 45 degrees.

Furthermore, the target location, particularly, the location of the Holy Hall of Great Hero, has been obtained in advance. Therefore, the first picture of the Holy Hall of Great Hero at the orientation of the longitude of 45 degrees and the latitude of 45 degrees may be determined according to this location determined in the mobile phone.

Figure 3:
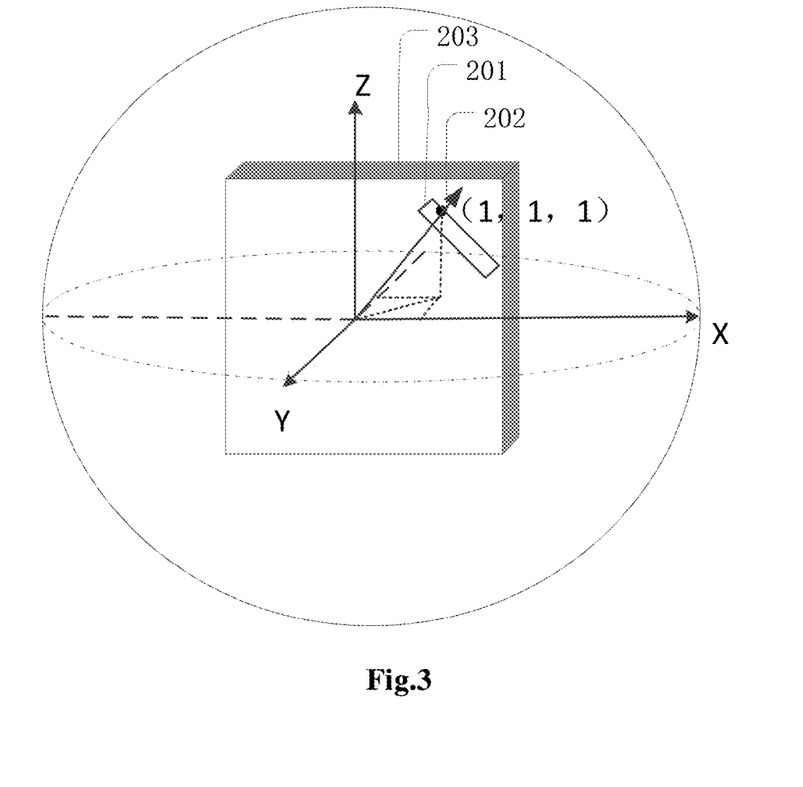
FIG. 3 is a schematic diagram of the Holy Hall of Great Hero in a three-dimension coordinate system according to an embodiment of this application.

For example, as illustrated in FIG. 3, the Holy Hall of Great Hero is assumed as a cubic building, and a three-dimension coordinate system with the origin being the center of the cubic can also be constituted for the cubic building 203. A sphere can be constituted by the three-dimension coordinate system, and the cubic building 203 lies in the sphere. At this time, the camera 202 in the mobile phone 201 is oriented to the location of the longitude of 45 degrees and the latitude of 45 degrees. Thus the particular location of the cubic building 203 that corresponds to the orientation of the longitude of 45 degrees and the latitude of 45 degrees in the sphere can be determined, and a picture focused on the determined location is the first picture.

Of course, although the Holy Hall of Great Hero has been described as a cubic building in the foregoing embodiment for the sake of a convenient description, in practice, if the electronic device needs to display another site, such a sit may not necessarily be a cubic building, and for a building in any shape a picture at any internal location of the building may be determined in the way described above.

After the first picture is determined, then the flow can proceed to S103 where the first picture is displayed by the display unit.

Furthermore, after the first picture is displayed, the flow can proceed to S104 where the second posture information of the first electronic device is detected by the sensing unit when there is a change in posture of the first electronic device.

In S104, when there is a change in posture of the mobile phone, the gyroscope in the mobile phone can detect the change in posture of the mobile phone, and after the mobile phone has its posture changed, a posture of the mobile phone at the stationary status in the end may be detected. Then the flow proceeds to S105 and S106.

In step of S105, the corresponding second picture is determined according to the second posture information.

It shall be appreciated that the process of determining the second picture is similar to the particular process of determining the first picture, and a repeated description thereof will be omitted here. After the second picture is determined, the flow can proceed to S107 where the second picture is displayed by the display unit.

The foregoing implementation relates to a particular implementation of the display method, and more particularly there are three possible schemes to match a picture, where the first scheme is to firstly download and then match locally a picture, the second scheme is to determine a corresponding picture according to posture information of the mobile phone after the posture information is determined, and the third scheme is to retrieve a corresponding picture in a local set of pictures in the mobile phone.

Figure 4:
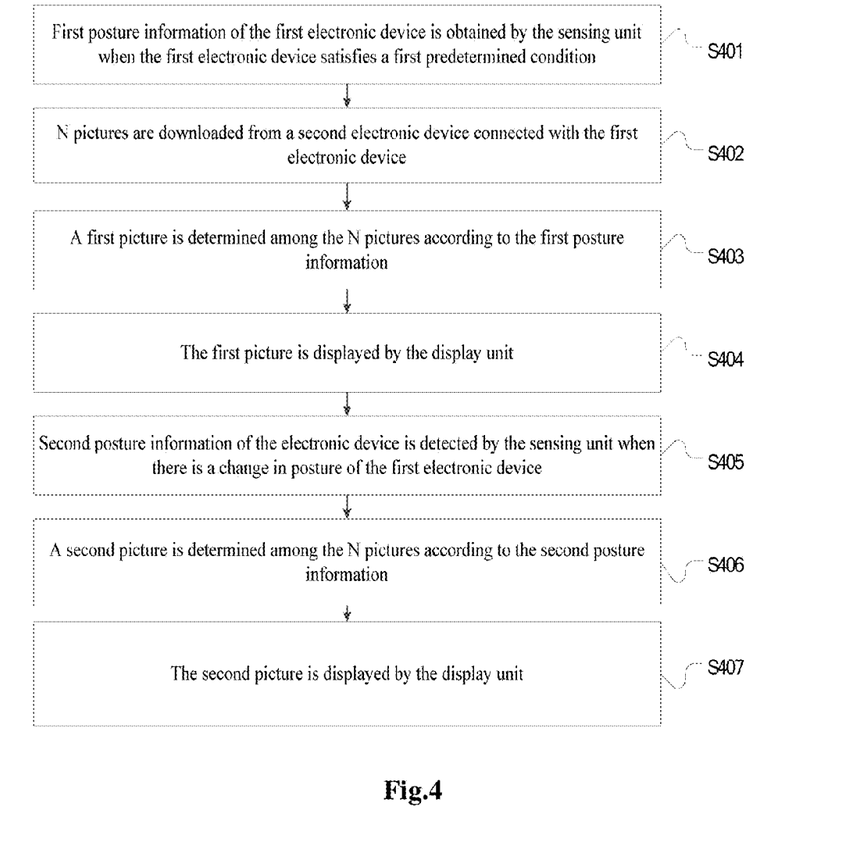
FIG. 4 is a flow chart of a particular implementation of local matching of a downloaded picture according to an embodiment of this application.

Specifically, reference can be made to FIG. 4 for a particular implementation of firstly downloading and then match locally a picture.

S401: First posture information of the first electronic device is obtained by the sensing unit when the first electronic device satisfies a first predetermined condition.

S402: N pictures are downloaded from a second electronic device connected with the first electronic device, Where N is an integer greater than or equal to 2.

S403: A first picture is determined among the N pictures according to the first posture information.

S404: The first picture is displayed by the display unit.

S405: Second posture information of the electronic device is detected by the sensing unit when there is a change in posture of the first electronic device.

S406: A second picture is determined among the N pictures according to the second posture information.

S407: The second picture is displayed by the display unit.

A particular embodiment will be described above.

An example will be given where the first electronic device is a mobile phone, the sensing unit is a gyroscope and the display unit is a display screen.

When a user needs to display a picture of a specific site, for example, some decoration scenes of a living room, the location of the living room will firstly be determined. With the location of the living room determined, the mobile phone will download a series of picture about the living room.

Furthermore, first posture information of the mobile phone will be obtained by the gyroscope, and then a picture of the living room at the same orientation as the mobile phone can be obtained according to the first posture information. The particular process of obtaining the first picture has been described in the foregoing embodiment, and a repeated description thereof will be omitted here.

Furthermore, the obtained first picture can be displayed by the display screen.

If there is a change in posture of the mobile phone, second posture information of the mobile phone after the change can be further determined by the gyroscope, and a corresponding second picture can be further determined and displayed.

Furthermore, for the displaying, the picture can alternatively be displayed by a projector.

Specifically, the first electronic device further includes a projection module by which the determined first picture or second picture can be displayed and projected to a projection area.

In the foregoing embodiment, the pictures will be firstly downloaded according to the location information and then match is performed. In the following embodiment, the picture can be obtained in real-time according to the changed posture information of the mobile phone, particularly with reference to FIG. 5.

Figure 5:
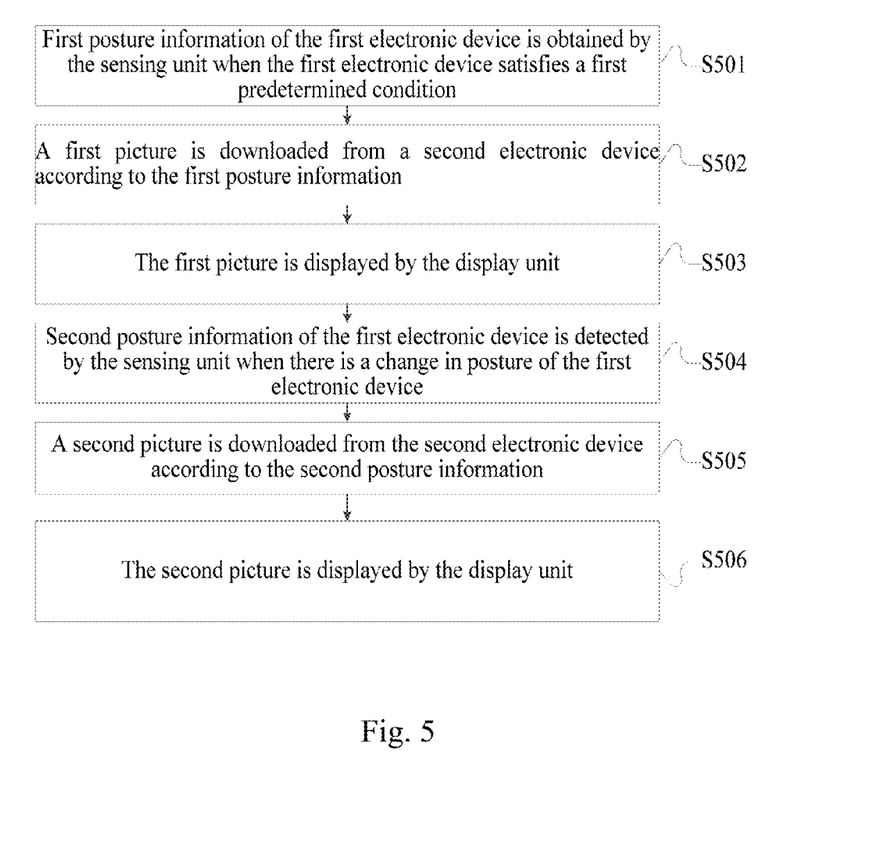
FIG. 5 is a flow chart of real-time retrieval of a picture in response to a changed posture information of a mobile phone according to an embodiment of this application.

S501: First posture information of the first electronic device is obtained by the sensing unit when the first electronic device satisfies a first predetermined condition.

S502: A first picture is downloaded from a second electronic device according to the first posture information.

S503: The first picture is displayed by the display unit.

S504: Second posture information of the first electronic device is detected by the sensing unit when there is a change in posture of the first electronic device.

S505: A second picture is downloaded from the second electronic device according to the second posture information.

S506: The second picture is displayed by the display unit.

A particular embodiment will be described below.

An example will be given where the first electronic device is a mobile phone, the sensing unit is a gyroscope and the display unit is a display screen.

When a user needs to display a picture of a specific site, for example, some decoration scenes of a living room, the location of the living room will firstly be determined.

Furthermore, first posture information of the mobile phone will be obtained by the gyroscope, and then a scene of the living room at the same orientation as the mobile phone can be obtained according to the first posture information. With the scene determined, the mobile phone will download a first picture including that scene.

The process of determining the first picture has been described in the foregoing embodiment, and a detailed description thereof will be omitted here.

Furthermore, the obtained first picture can be displayed by the display screen.

When there is a change in posture of the mobile phone, second posture information of the mobile phone after the change can be further determined by the gyroscope, a corresponding scene may be determined and then the second picture can be determined according to the scene and then be displayed.

Furthermore, for the displaying, the picture can alternatively be displayed by a projector.

Specifically, the first electronic device further includes a projection module by which the determined first picture or second picture can be displayed and projected to a projection area.

Figure 6:
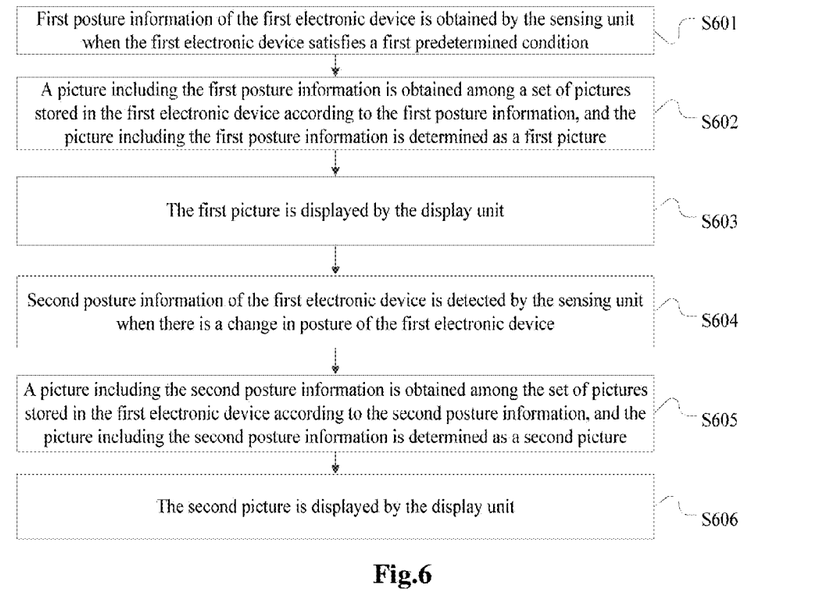
FIG. 6 is a flow chart of retrieving a picture in a local set of pictures in response to a changed posture information of a mobile phone according to an embodiment of this application.

In the following embodiment, retrieval of a corresponding picture in a local set of pictures in the mobile phone will be described in details, particularly with reference to FIG. 6.

S601: First posture information of the first electronic device is obtained by the sensing unit when the first electronic device satisfies a first predetermined condition.

S602: A picture including the first posture information is obtained among a set of pictures stored in the first electronic device according to the first posture information, and the picture including the first posture information is determined as a first picture.

S603: The first picture is displayed by the display unit.

S604: Second posture information of the first electronic device is detected by the sensing unit when there is a change in posture of the first electronic device.

S605: A picture including the second posture information is obtained among the set of pictures stored in the first electronic device according to the second posture information, and the picture including the second posture information is determined as a second picture.

S606: The second picture is displayed by the display unit.

A particular embodiment will be described above.

An example will be given where the first electronic device is a mobile phone, the sensing unit is a gyroscope and the display unit is a display screen.

When a user needs to display some decoration scenes of a living room, it will be firstly judged whether the first electronic device satisfies a predetermined condition, for example, whether the location of the first electronic device at that time is far away from the location of the living room, for example, the user holding the first electronic device is working at his or her office, and first posture information of the mobile phone will be obtained by the gyroscope upon detecting that the long distance between the first electronic device and the living room is in a predetermined distance range.

Furthermore, the mobile phone will be searched for a picture of the living room corresponding to the first posture information, that is, a picture of the living room at the same orientation as the mobile phone will be obtained, according to the first posture information.

Furthermore, the obtained first picture can be displayed by the display screen.

If there is a change in posture of the mobile phone, then changed second posture information of the mobile phone will be further determined by the gyroscope, and a corresponding scene can be further determined, and then a second picture can be determined according to the scene and then be displayed.

Furthermore, for the displaying, the picture can alternatively be displayed by a projector.

Specifically, the first electronic device further includes a projection module by which the determined first picture or second picture can be displayed and projected to a projection area.

The implementations of the display method have been described in the foregoing embodiments, and an electronic device will be described in the following embodiment based upon the same inventive idea.

Second Embodiment

There is disclosed an electronic device in the embodiment of this application.

Figure 7:
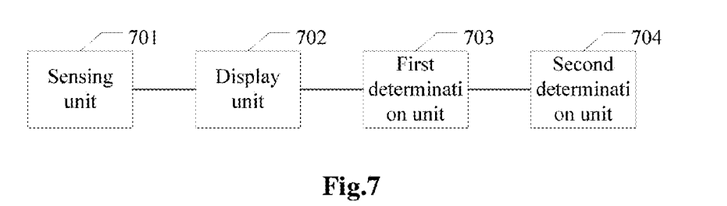
FIG. 7 is a schematic diagram of an electronic device according to an embodiment of this application.

Referring particularly to FIG. 7, the electronic device includes a sensing unit 701 and a display unit 702, and moreover the electronic device further includes a first determination unit 703 and a second determination unit 704.

The sensing unit 701 is configured to obtain first posture information of the first electronic device when the first electronic device satisfies a predetermined condition;

The first determination unit 703 is configured to determine a first picture according to the first posture information;

The display unit 702 is configured to display the first picture;

The sensing unit 701 is configured to detect second posture information of the first electronic device when there is a change in posture of the first electronic device;

The second determination unit 704 is configured to determine a second picture according to the second posture information; and The display unit 702 is configured to display the second picture.

Furthermore, the electronic device further includes a download unit.

The download unit is configured to download N pictures from a second electronic device connected with the first electronic device before the first picture is determined according to the first posture information, where N is an integer greater than or equal to 2.

Furthermore, the first determination unit 703 is further configured to determine the first picture among the N pictures according to the first posture information.

Furthermore, the second determination unit 704 is further configured to determine the second picture among the N pictures according to the second posture information.

Third Embodiment

There is an image capturing method described in the embodiment of this application.

The method is applicable to an electronic device including a sensing unit and an image capturing unit.

In the embodiment of this application, the sensing unit can be a gyroscope, and the display unit can be a display screen, where the display screen may be or may not be provided with a touch function. The electronic device including both of the sensing unit and the image capturing unit can be embodied in numerous electronic devices, e.g., a notebook computer, a PAD, an one-in-all computer, a mobile phone, etc.

Specifically, a particular implementation of image capturing in the embodiment of this application is as follows:

In a first step, first posture information of the electronic device is obtained by the sensing unit when the electronic device detects an image capturing instruction of a user.

In a second step, a first image is captured by the image capturing unit when the electronic device takes a posture corresponding to the first posture information.

The first image includes the first posture information.

Taking a mobile phone as an example, the first posture information of the electronic device can be obtained by the sensing unit when the mobile phone detects the image capturing instruction of the user.

For example, the user holding the mobile phone in a living room is ready to take a picture, and when the user presses down a camera key, for the mobile phone, first posture information of the mobile phone at that time is detected by the gyroscope.

In the embodiment of this application, the first posture information of the mobile phone can indicate a specific angle at which the mobile phone takes the picture, for example, if the first posture information of the mobile phone is the posture information exemplified in FIG. 2, then the taken picture shall be a picture of a scene in the living room at the longitude of 45 degrees and the latitude of 45 degrees. Thus, after the picture is taken, the taken picture includes the posture information at the time of taking the picture. When the mobile phone taking the first posture needs to display the picture, the picture including the posture information may be searched in a library of pictures and then can be displayed accordingly.

Furthermore, second posture information of the electronic device can be further obtained by the sensing unit when there is a change in posture of the electronic device. When the electronic device takes a posture corresponding to the second posture information, a second image can be captured by the image capturing unit, where the second image includes the second posture information.

The picture can be taken similarly to that described above, except that a different angle may be taken by the mobile phone to take the picture. For example, the mobile phone is oriented at the longitude of 65 degrees and the latitude of 5 degrees at that time, and then the second picture taken at that time is a scene of the living room at the longitude of 65 degrees and the latitude of 5 degrees.

An electronic device corresponding to the method will be described in the following embodiment based upon the same inventive idea.

Fourth Embodiment

There is provided an electronic device in the embodiment of this application.

In the embodiment of this application, the electronic device includes a sensing unit and an image capturing unit.

In the embodiment of this application, the sensing unit can be a gyroscope, and the display unit can be a display screen, where the display screen may be or may not be provided with a touch function. The electronic device including both of the sensing unit and the image capturing unit can be embodied in numerous electronic devices, e.g., a notebook computer, a PAD, an one-in-all computer, a mobile phone, etc.

Specifically, functions of the respective units will be described below.

The sensing unit is configured to obtain first posture information of the electronic device when the electronic device satisfies a predetermined condition.

The image capturing unit is configured to capture a first image when the electronic device takes a posture corresponding to the first posture information, where the first image includes the first posture information.

Furthermore, the sensing unit is further configured to, after the image capturing unit captures the corresponding image, obtain second posture information of the electronic device when there is a change in posture of the electronic device.

The image capturing unit is further configured to capture a second image when the electronic device takes a posture corresponding to the second posture information, where the second image includes the second posture information.

With one or more of the embodiments of the disclosure, the following technical effects can be achieved.

In one or more of the embodiments of the disclosure, there is disclosed a display method in which a displayed picture can be changed in response to a change in posture information of the first electronic device by detecting automatically the posture of the first electronic device and then matching the corresponding picture to the posture, so the display method of the disclosure can match the corresponding picture automatically to the posture of the first electronic device without manual matching by a user. In a particular implementation, first posture information of the first electronic device is obtained by the sensing unit when the first electronic device satisfies a predetermined condition, and the first posture information here indicates a particular orientation of the first electronic device, e.g., oriented 15 degrees southward, and then when the mobile phone needs to display a picture or take a picture, only a picture at the orientation of 15 degrees southward can be obtained. Then a first picture can be further determined according to first location information and the first posture information, and the picture determined here is a picture at the same orientation as the first electronic device. Then the first picture can be displayed by the display unit. Furthermore, when there is a change in posture of the first electronic device, second posture information of the first electronic device can be detected by the sensing unit, and the posture information here can also characterize the orientation of the first electronic device. Then a second picture can be determined according to the first location and the second posture information. Finally the second picture can be displayed by the display unit.

Furthermore, for the picture download, a plurality of pictures may be downloaded as a whole to the first electronic device, and then a corresponding picture can be matched to different posture information of the first electronic device. Alternatively, a corresponding picture can be downloaded in real-time according to different posture information of the first electronic device.

It should be understood by those skilled in the art that, the embodiments according to the present disclosure may be implemented as a method, system or computer program product. Hence, the embodiments of the disclosure may be implemented with hardware only, with software only, or with a combination of hardware and software. Furthermore, the embodiments of the present disclosure may be implemented in computer program products in the form of computer readable media (including but not limited to magnetic disk storages, optical storages, etc.) storing computer executable codes.

The description in this disclosure is made in conjunction with flowchart(s) and/or block diagram(s) of the method, device (system) or computer program product according to the embodiments of the disclosure. It should be understood that each process in the flowchart and/or each block in the block diagram and any combination of processes and/or blocks in the flowchart and/or the block diagram may be implemented through computer program instructions. The computer instructions may be provided to a processor of a general-purpose computer, dedicated computer, embedded processing machine or any other programmable data processing device to achieve a machine, in which device(s) to implement functions specified in one or more processes of the flowchart and/or one or more blocks of the block diagram is(are) achieved through executing the instructions by the computer or any other programmable data processing device.

The computer program instructions may further be stored in a computer readable storage which may lead the computer or any other programmable data processing device to operation in particular manner in order that a product including an instruction device is generated according to the instructions stored in the computer readable storage, where the instruction device is configured to implement the functions specified in one or more processes of the flowchart and/or one or more blocks of the block diagram.

The computer program instructions may further be loaded to the computer or any other programmable data processing device in order that a series of steps are executed on the computer or any other programmable data processing device to generate processes implemented by the computer, and the steps to implement the functions specified in one or more processes of the flowchart and/or one or more blocks of the block diagram are provided by the instructions executed on the computer or any other programmable data processing device.

Obviously, various changes and modifications can be made to the disclosure by those skilled in the art without departing from the spirit and scope of the disclosure. The disclosure intends to cover those changes and modifications within the scope of the claims of the disclosure and equivalents thereof.

The invention claimed is:

1. A display method, applicable to a first electronic device comprising a sensing unit and a display unit, wherein the method comprises:
obtaining first posture information of the first electronic device by the sensing unit, wherein the sensing unit is triggered when a distance from a location of the first electronic device to a target location satisfies a predetermined threshold, wherein the target location is the location as displayed in a first picture to be downloaded by a user;
displaying a first picture by the display unit based on the first posture information, wherein the first picture is searched for among N pictures pre-stored locally or remotely based on the first posture information, wherein N is an integer greater than or equal to 2;
detecting second posture information of the first electronic device by the sensing unit when there is a change in posture of the first electronic device; and
displaying a second picture by the display unit based on the second posture information, wherein the second picture is searched for among the N pictures pre-stored locally or remotely according to the second posture information.

2. The method according to claim 1, wherein before the searching for the first picture according to the first posture information, the method further comprises:
downloading the N pictures by the first electronic device from a second electronic device.

3. The method according to claim 2, wherein the searching for the first picture according to the first posture information comprises:
searching for the first picture among the N pictures according to the first posture information.

4. The method according to claim 2, wherein the searching for the second picture according to the second posture information comprises:
searching for the second picture among the N pictures according to the second posture information.

5. The method according to claim 1, wherein the searching for the first picture according to the first posture information comprises:
searching, according to the first posture information, for the first picture among the N pictures pre-stored on a second electronic device and downloading the first picture from the second electronic device.

6. The method according to claim 1, wherein in a case that the first electronic device further comprises a projection unit, after the searching for the first picture according to the first posture information, the method further comprises:
projecting the first picture to a projection area by the projection unit.

7. The method according to claim 1, wherein the searching for the second picture according to the second posture information comprises:
searching, according to the second posture information, for the second picture among the N pictures pre-stored on a second electronic device and downloading the second picture from the second electronic device.

8. The method according to claim 1, wherein the searching for the first picture according to the first posture information comprises:
obtaining, according to the first posture information, a picture comprising the first posture information in a set of pictures stored in the first electronic device, and determining the picture comprising the first posture information as the first picture.

9. The method according to claim 1, wherein the searching for the second picture according to the second posture information comprises:
obtaining, according to the second posture information, a picture comprising the second posture information in a set of pictures stored in the first electronic device, and determining the picture comprising the second posture information as the second picture.

10. An electronic device, comprising:
a sensing unit configured to be triggered to obtain first posture information of the electronic device when a distance from a location of the electronic device to a target location satisfies a predetermined threshold, wherein the target location is the location as displayed in a first picture to be downloaded by a user;
a display unit configured to display a first picture based on the first posture information, wherein the first posture is searched for among N pictures pre-stored locally or remotely based on the first posture information, wherein N is an integer greater than or equal 2;

wherein the sensing unit is further configured to detect second posture information of the electronic device when there is a change in posture of the electronic device; and the display unit is further configured to display a second picture based on the second posture information, wherein the second picture is searched for among the N pictures pre-stored locally or remotely according to the second posture information.

11. The electronic device according to claim 10, wherein the electronic device further comprises:

a download unit configured to download the N pictures from a second electronic device connected with the electronic device.

12. The electronic device according to claim 11, further comprising: a first determination unit configured to search for the first picture among the N pictures according to the first posture information.

13. The electronic device according to claim 11, further comprising: a second determination unit configured to search for the second picture among the N pictures according to the second posture information.

\* \* \* \* \*